(12) United States Patent
Hong et al.

(10) Patent No.: US 6,330,694 B1
(45) Date of Patent: Dec. 11, 2001

(54) FAULT TOLERANT SYSTEM AND METHOD UTILIZING THE PERIPHERAL COMPONENTS INTERCONNECTION BUS MONITORING CARD

(75) Inventors: Sung-Bin Hong, Seoul; Dong-Wook Suh, Sungnam, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/234,372

(22) Filed: Jan. 21, 1999

(30) Foreign Application Priority Data

Jan. 22, 1998 (KR) .................................................. 98/1911

(51) Int. Cl.⁷ .......................... G06F 13/40; G06F 13/38; G06F 11/07
(52) U.S. Cl. ................................ 714/56; 714/4; 710/129; 370/401
(58) Field of Search .................... 714/4, 43, 48, 714/56; 709/224, 248, 253; 710/126, 129; 713/100; 370/351, 355, 401, 402, 216, 489; 340/825.06; 385/100

(56) References Cited

U.S. PATENT DOCUMENTS 5,724,528 * 3/1998 Kulik et al. .
5,878,237 * 3/1999 Olarig .

* cited by examiner

*Primary Examiner*—Gopal C. Ray
(74) *Attorney, Agent, or Firm*—Robert E. Bushnell, Esq.

(57) ABSTRACT

An apparatus and method for guaranteeing the integrity of a PCI bus is disclosed. Multiple general purpose computers are connected using the PCI bus, and the PCI bus signals between or among them are compared. The present invention comprises general purpose computers, PCI monitoring cards, and network lines. An apparatus and a method for detecting faults are provided without adopting an exclusive CPU board or input/output bus to detect faults. A PCI monitoring card is appended to each general purpose computer system, and the computer systems are connected to electronic communication media.

24 Claims, 4 Drawing Sheets

FAULT TOLERANT SYSTEM AND METHOD UTILIZING THE PERIPHERAL COMPONENTS INTERCONNECTION BUS MONITORING CARD

CLAIM OF PRIORITY

This application makes reference to, incorporates the same herein, and claims all benefits accruing under 35 U.S.C. §119 from an application for FAULT TOLERANT SYSTEM UTILIZING THE PERIPHERAL COMPONENTS INTERCONNECTION BUS MONITORING CARD earlier filed in the Korean Industrial Property Office on Jan. $22^{ND}$ of 1998 and there duly assigned Ser. No. 1911/1998.

BACKGROUND OF THE INVENTION

1. Technical Field

The present invention relates to a fault detection apparatus and method utilizing a PCI (peripheral components interconnection) bus monitoring card. More specifically, the present invention is related to an apparatus and method for guaranteeing the integrity of the PCI bus by connecting a plurality of general purpose computers using a PCI bus and comparing the PCI bus signals between or among them.

2. Related Art

Typically, fault detection systems necessarily have their own central processing unit (CPU) boards or their own input/output buses. This leads to several disadvantages: an increase in design problems; increase in the time to develop new or modified systems; increased complexity of such systems; greater cost in developing and producing such systems; and increased probability of system malfunction or failure.

Exemplars of recent efforts in the art include U.S. Pat. No. 5,822,512 for Switching Control in a Fault Tolerant System issued to Goodrum et al. The aforementioned patent is different from the present invention.

SUMMARY OF THE INVENTION

It is an object of the present invention to provide an apparatus and method for detecting fault, without providing an exclusive CPU board or input/output bus to detect fault. Rather, a PCI monitoring card is appended to the general purpose computer system, and the computer systems are connected to electronic communication media.

In one aspect of the invention, a fault tolerant system utilizing a plurality of general purpose computers equipped with PCI (peripheral components interconnection) comprises: a PCI monitoring card, connected to the general purpose computer by utilizing a PCI bus, for detecting faults by comparing the PCI bus signals of one of the general purpose computers with the PCI bus signals of the other general purpose computers; and network lines connecting the PCI monitoring card of one general purpose computer with the PCI monitoring cards of the other general purpose computers.

The PCI monitoring card is connected to the CPU(Central Processing Unit) of its computer by means of a the PCI bridge. The PCI monitoring card receives the address and data bus signals from its computer, and compares them with the address and data bus signals of the other computer. When they are different from each other, interrupt signals are generated. The PCI monitoring card transmits an interrupt signal to its computer and to the other computers.

The PCI monitoring card comprises: a FIFO( First In First Out ) memory for storing the received address and data bus signals by utilizing the PCI bus; compulsive stop logic for activating a stop signal to temporarily stop the PCI transaction when the capacity of the FIFO memory is stack full; communication ports for transmitting the address and data bus signals received from the FIFO memory to the other computers, or for receiving the address and data bus signals from the other computers; and a bus comparator for comparing the address and data bus signals of its computer with those of the other computers as respectively received from the FIFO memory and communication port, and for generating an interrupt signal when the signals are different from each other.

The FIFO memory, comprised of 32-bit clocked memories, stores the 32-bit address and data bus signals received from the PCI. When the FIFO memory is full, it generates a status signal in order to temporarily stop PCI bus transactions.

Communication ports, comprised of fiber channel communication ports, receive and transmit data from and to the other computers by utilizing fiber channels.

Communication ports, comprised of fast ethernet ports, receive and transmit data from and to the other computers by utilizing fast ethernet.

The bus comparator reports the interrupt signals to its computer and to the other computers through the PCI bus. The bus comparator comprises a dual 32-bit comparator for comparing the received 32-bit address and data bus signals.

In another aspect of the invention, a fault tolerant method utilizes the PCI (peripheral components interconnection) bus monitoring card, and comprises the steps of: receiving the address and data PCI bus signals from its computer; receiving the address and data PCI bus signals from the other computers through the network; comparing the address and data PCI bus signals of its computer with those of the other computers, and, when they are identical, comparing the next signals; generating an interrupt signal when the compared signals are different; transmitting an interrupt signal to its computer; and transmitting an interrupt signal to the other computers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
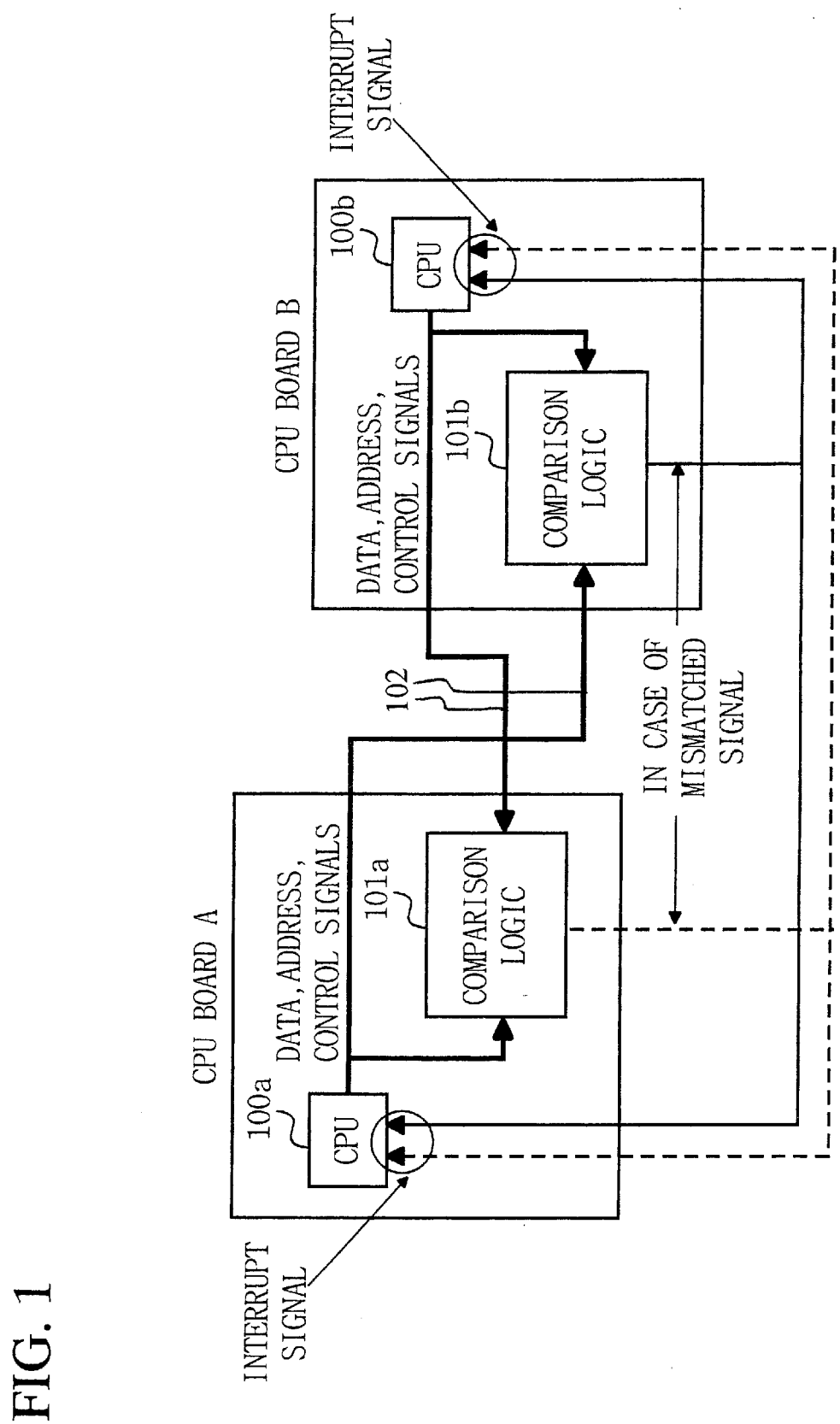
FIG. 1 illustrates a schematic diagram of a fault detecting apparatus on the basis of CPU level.

FIG. 1 shows a schematic diagram of a fault detecting apparatus on the basis of CPU operation level. As illustrated, in order to detect fault on the basis of CPU operation level, two CPU boards (CPU board A, CPU board B) with identical structure are connected by utilizing the local buses 102. Each local bus 102 is connected to each CPU 100a, 100b, and carries data, address and control signals. CPU boards A and B have respective comparison logics 101a, 101b connected to the local buses 102. The comparison logics 101a, 101b detect fault by comparing the signals of the two local buses 102. When the signals of the two local buses 102 mismatch (that is, a fault occurs), the fault is reported to the CPU 100a or 100b by utilizing interrupt signals.

Figure 2:
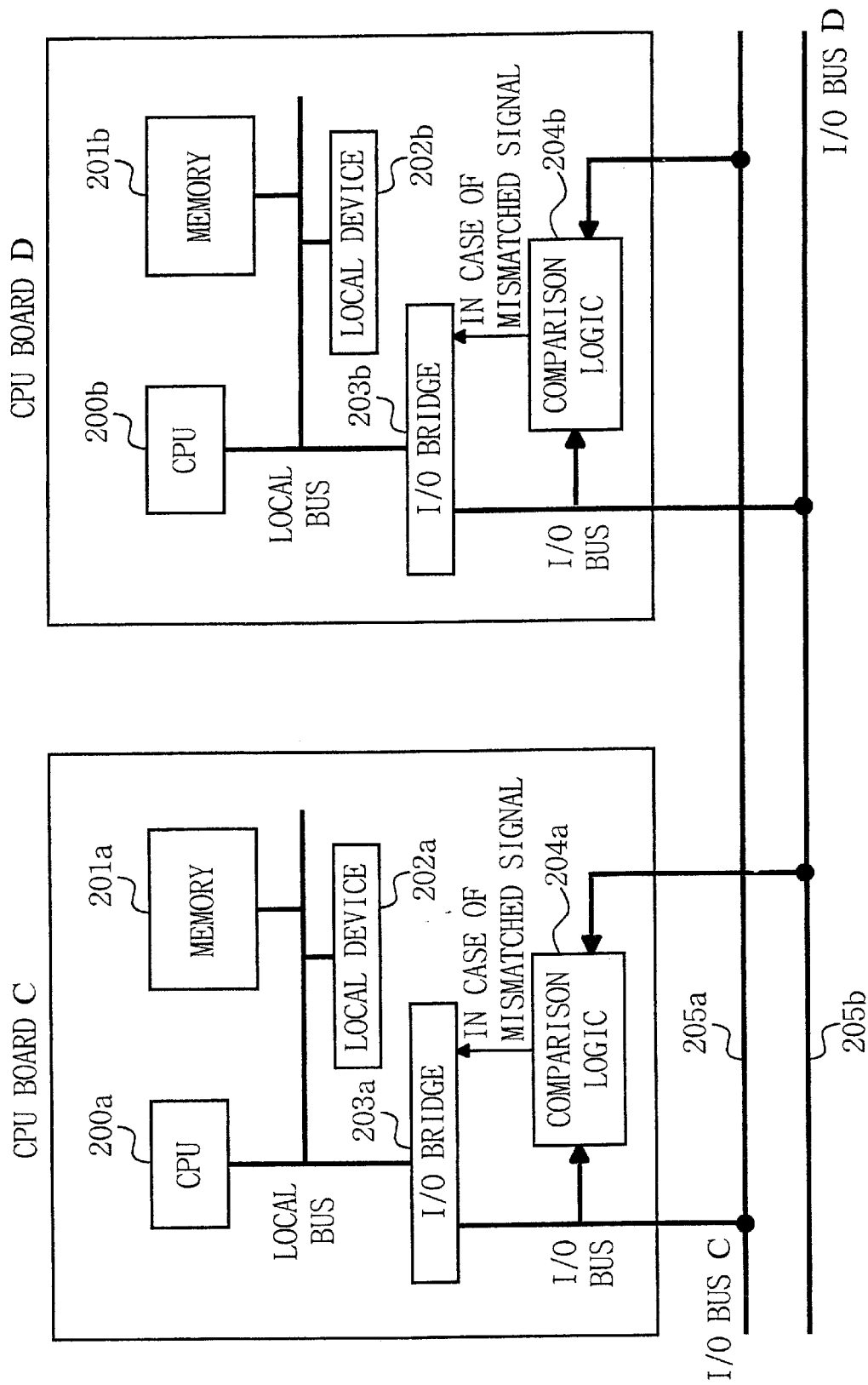
FIG. 2 illustrates a schematic diagram of a fault detecting apparatus on the basis of input/output level.

FIG. 2 shows a schematic diagram of a fault detecting apparatus on the basis of input/output bus level. As illustrated, in order to detect fault on the basis of the input/output level, CPU boards C and D with identical structure (including CPU's 200a and 200b, memories 201a and 201b, and local devices 202a and 202b) are connected by utilizing a dual input/output bus 205a, 205b. The CPU boards C and D have respective comparison logics 204a, 204b connected to each input/output bus 205a, 205b. The comparison logics 204a, 204b detect fault by comparing the dual input/output buses 205a, 205b. When the above-noted buses are different (that is, a fault occurs), the fault is reported to the CPU 200a, 200b through the input/output bridges 203a, 203b.

Fault detection systems utilizing the above-mentioned structure must have their own CPU boards or input/output buses. This increases the problem of designing or developing new systems, and causes the fault detection system to be more expensive than general purpose computer systems. Furthermore, adding fault detection logic to the CPU board causes the system to be complicated, thereby increasing the probability of fault or system failure.

Figure 3:
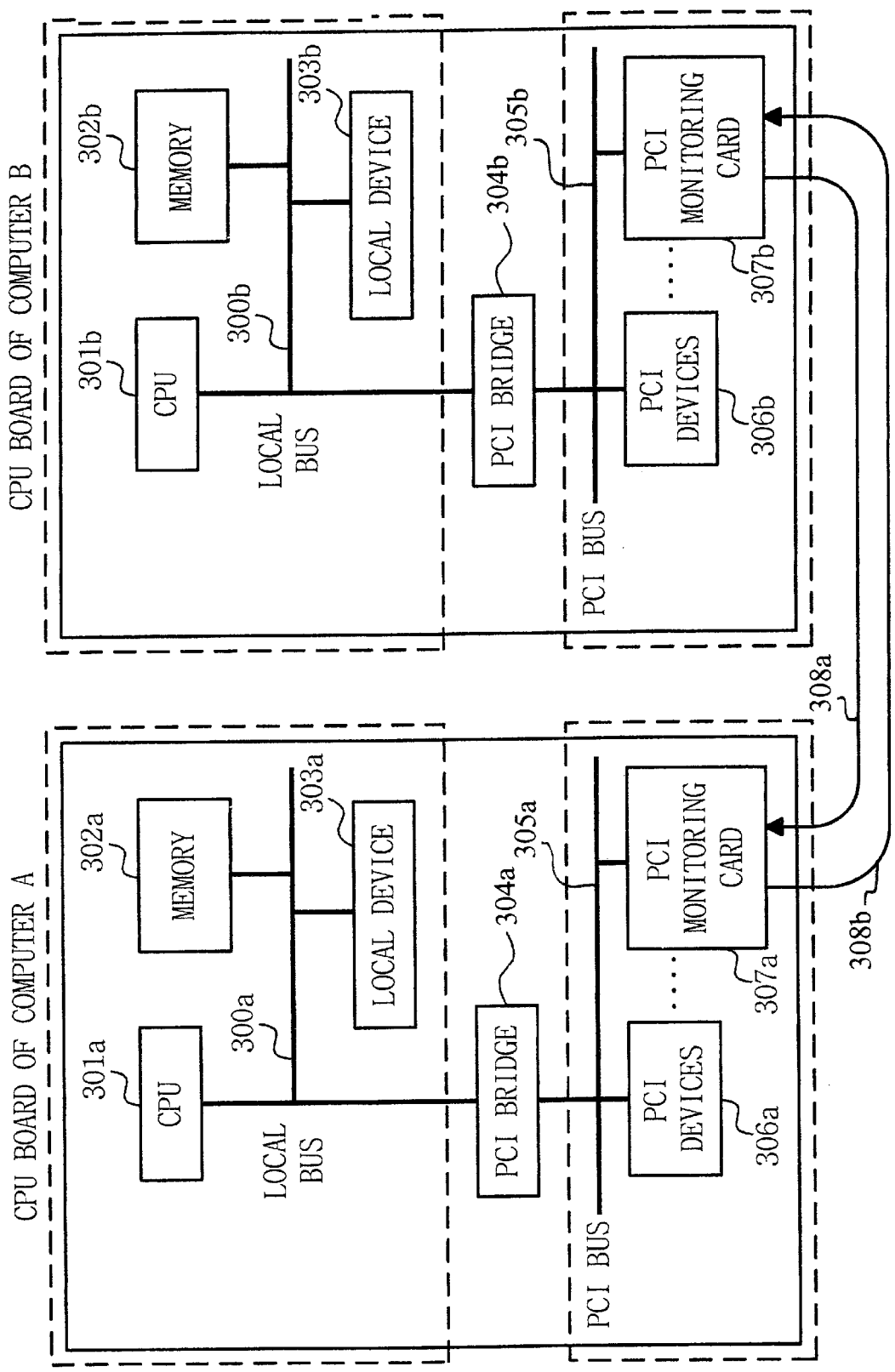
FIG. 3 illustrates a schematic diagram of a fault detecting apparatus according to the present invention.

FIG. 3 shows a schematic diagram of a fault detecting apparatus according to the present invention. As illustrated, the system includes: PCI bridges 304a, 304b connected to CPUs 301a, 301b of the computers by utilizing the local buses 300a, 300b; PCI devices 306a, 306b connected to the PCI bridges 304a, 304b by utilizing the PCI buses 305a, 305b; PCI monitoring cards 307a, 307b connected to the PCI bridges 304a, 304b by utilizing the PCI buses 305a, 305b; and network lines 308a, 308b interconnecting the PCI monitoring cards 307a, 307b of the computers.

Each PCI monitoring card 307a, 307b is associated with a general purpose computer system, and they are connected by utilizing the network lines 308a, 308b.

The computers connected by utilizing the network lines 308a, 308b check each other's address and data bus via the PCI buses 305a, 305b, and transmit them to other computers. Therefore, a system fault is detected by concurrently comparing the system with other systems.

Figure 4:
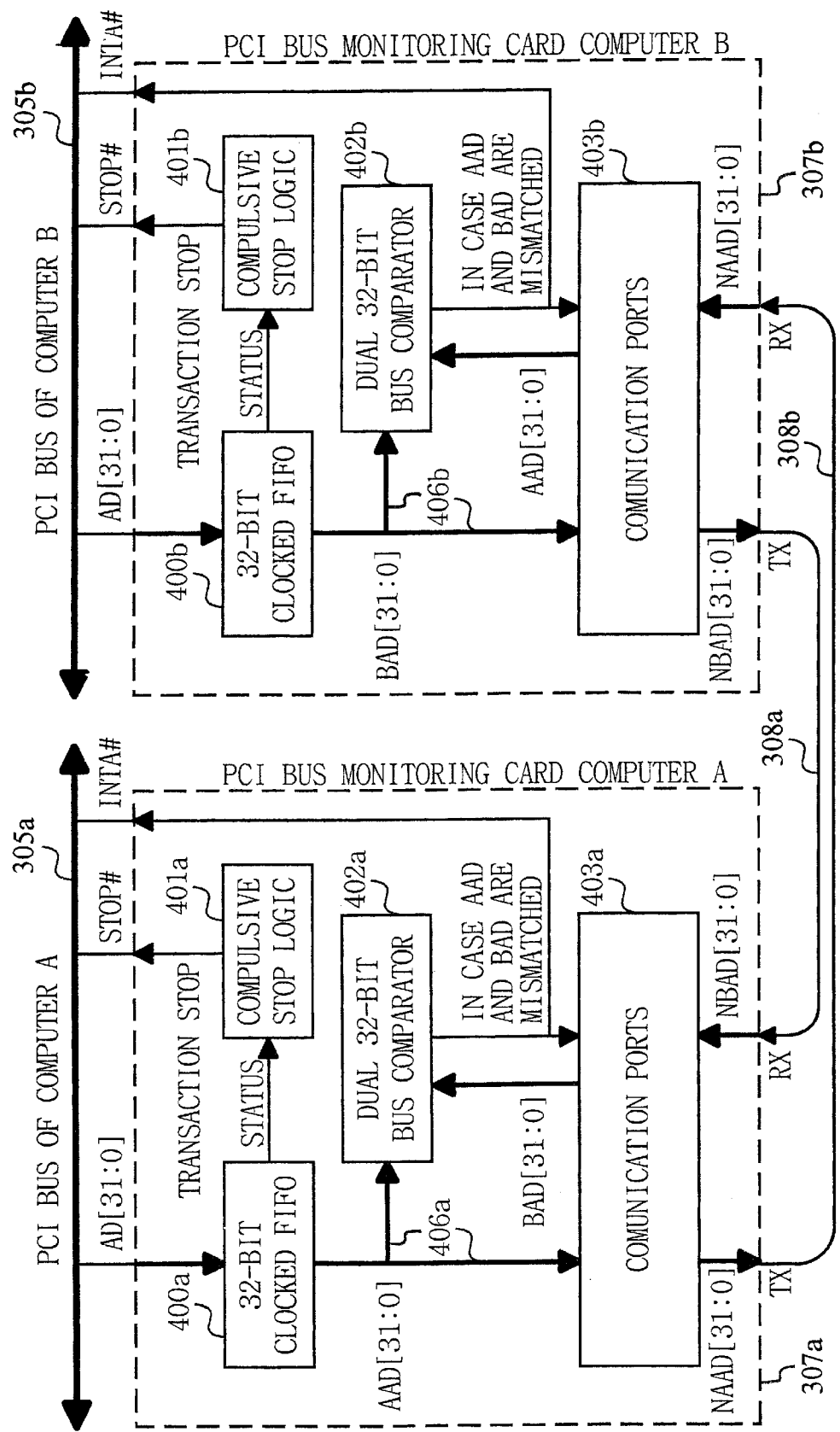
FIG. 4 illustrates a schematic diagram of a PCI monitoring card structure.

FIG. 4 shows an inner structure of the PCI monitoring cards 307a, 307b of FIG. 3. As illustrated, the PCI monitoring cards 307a, 307b include: FIFO memories 400a, 400b which are 32-bit clocked, and which receive the address and data signals by utilizing the PCI buses 305a, 305b of their computers; compulsive stop logics 401a, 401b for receiving status signals from the FIFO memories 400a, 400b and transmitting stop signals to their computers; communication ports 403a, 403b for transmitting the address and data signals received from the FIFO memories 400a, 400b to the other computers, and for receiving the address and data signals of the other computers; and dual 32-bit bus comparators 402a, 402b for comparing the address and data signals received from the FIFO memories 400a, 400b and the communication ports 403a, 403b, and for transmitting a mismatch signal to the other computers.

The FIFO memories 400a, 400b read AD[31:0] (that is, the address and data bus of the PCI bus 305a, 305b) and transmit them to the other computers by utilizing the fast networks of ports 403a, 403b, such as fiber channel or fast ethernet. The AD[31:0] of the FIFO memories 400a, 400b are concurrently transmitted to the bus comparators 402a, 402b, and are compared with the signals received from the other computers through the communication ports 403a, 403b.

When two compared signals do not match, the mismatched signals are reported to the CPU 301a, 301b of its computer as an interrupt signal. It is also transmitted to the other computer in order to facilitate fault detection.

When the FIFO memories 400a, 400b memories are full, the transactions of the PCI bus 305a, 305b must be stopped. Therefore, the full FIFO memories 400a, 400b transmit a status signal to the compulsive stop logics 410a, 401b so as to temporarily stop the transactions of the PCI buses 305a, 305b.

As previously mentioned, 32-bit clocked FIFO memories are utilized. The bus comparators 402a, 402b are arranged for dual 32-bit operation in order to compare the 32-bit bus signals of both computers. A fiber channel of 100 Mbps or a fast ethernet of 10BASE-T/100BASE-TX is utilized.

The operation of the present invention is now explained.

Each PCI monitoring card 307a, 307b is associated with a PCI bus 305a, 305b of the computer A, computer B. Each PCI monitoring card 307a, 307b receives and transmits the data of its computer and the other computer, and compares them concurrently. When the compared results are identical, which means that no fault is found, a next procedure is executed. When the compared results are different, the computer which detected the fault generates an interrupt signal and reports it to the other computer.

The operation of the present invention is explained in more detail with regard to computer A.

The signals from PCI bus 305a, as received through the AD[31:0] line, are written to the 32-bit clocked FIFO 400a. The AD[31:0] line is a multiplexed bus for the address and data of the PCI bus 305a. The capacity of the FIFO memory 400a is checked. When the capacity of the FIFO memory 400a is full, the FIFO memory 400a transmits a status signal to the compulsive stop logic 401a, and the compulsive stop logic 401a is activated to generate a stop signal STOP#. Therefore, the PCI transaction being executed or to be executed is temporarily stopped. After this, when the contents of the FIFO memory 400a decreases, the FIFO memory 400a starts storing data again.

The contents of the FIFO memory 400a are transmitted to the communication port 403a through the AAD[31:0] line, the communication port 403a being a fiber channel or a fast ethernet. The data leaving the NAAD[31:0] line of communication port 403a are transmitted to the NAAD[31:0] line of the other communication port 403b, thereby entering the dual 32-bit bus comparator 402b of computer B. The comparator 402b in computer B compares the entered data with the data received from the FIFO 400b of computer B.

Concurrently with the above operation, the data leaving the 32-bit clocked FIFO 400a are transmitted to the dual 32-bit bus comparator 402a through the AAD[31:0] line 406a. The bus comparator 402a in computer A compares the data of the AAD[31:0] line with the data of the BAD[31:0] line received from computer B via communication ports 403a. When the compared data are identical, then the next data are compared. However, when the compared data are not identical, a mismatch signal is generated to activate the interrupt signal INTA# of computer A. Concurrently, the mismatch signal is transmitted to computer B so as to indicate that a fault is detected.

After receiving the interrupt signal computer A detects the fault and tries to determine the cause of the fault. Computer B also detects the fact that a fault has occurred in computer A, and tries to determine the cause of the fault. At this point, computers A and B stop all other operations and check the fault which has occurred.

The operation of the present invention will now be explained in more detail with regard to computer B.

The signals received through the AD[31:0] line are written to the 32-bit clocked FIFO 400b. The AD[31:0] line is a multiplexed bus of the address and data of the PCI bus 305b. The capacity of the FIFO memory 400b is checked. When the capacity of the FIFO memory 400b is full, the FIFO memory 400b transmits a status signal to the compulsive stop logic 401b, and the compulsive stop logic 401b is activated to generate a stop signal STOP#. Therefore, the PCI transactions being executed or to be executed are temporarily stopped. After this, when the contents of the FIFO memory 400b decreases, the FIFO memory 400b starts storing data again.

The contents of the FIFO memory 400b are transmitted to the communication port 403b through the line BAD[31:0], the communication port 403b being a fiber channel or a fast ethernet. The transmitted data leaving the NBAD[31:0] line of the communication port 403b are transmitted to the NBAD[31:0] line of the other communication port 403a, thereby entering the dual 32-bit bus comparator 402a of computer A. The comparator 402a in computer A compares the entered data with the data received from the FIFO 400a of computer A.

Concurrently with the above operation, the data leaving the 32-bit clocked FIFO 400b are transmitted to the dual 32-bit bus comparator 402b through the BAD[31:0] line 406b. The bus comparator 402b in computer B compares the data of the BAD[31:0] line with the data of the AAD[31:0] line received from computer A via communication port 403b. When the compared data are identical, then next data are compared. However, when the compared data are not identical, a mismatch signal is generated to activate the interrupt signal INTA# of computer B. Concurrently, the mismatch signal is transmitted to computer A so as to indicate that a fault is detected.

After receiving the interrupt signal, computer B detects the fault and tries to determine the cause of the fault. Computer A also detects the fact that a fault has occurred in computer B, and tries to determine the cause of the fault. At this point, computer A and B stop all other operations and check on the fault which has occurred.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A fault tolerant system for multiple general purpose computers, each equipped with a peripheral components interconnection (PCI) bus, said system comprising:
   PCI monitoring cards, one for each of said general purpose computers, each of said PCI monitoring cards being connected to a respective one of said PCI buses for detecting faults by comparing PCI bus signals of one of said general purpose computers with the PCI bus signals of others of said general purpose computers; and
   network lines for connecting the PCI monitoring card of each of said general purpose computers with the PCI monitoring cards of the others of said general purpose computers.

2. The system as set forth in claim 1, wherein each said PCI monitoring card is connected to a central processing unit (CPU) of said one of said general purpose computers via a PCI bridge.

3. The system as set forth in claim 1, wherein each said PCI monitoring card receives address and data bus signals from said one of said general purpose computers, and compares said address and data bus signals with address and data bus signals of the others of said general purpose computers, and wherein each said PCI monitoring card generates an interrupt signal when a mismatch between the address and data signals is detected.

4. The system as set forth in claim 3, wherein each said PCI monitoring card transmits said interrupt signal to said one of said general purpose computers and to the others of said general purpose computers.

5. The system as set forth in claim 3, wherein each said PCI monitoring card comprises:
   a first in first out (FIFO) memory for storing the received address and data bus signals;
   compulsive stop logic for activating a stop signal to temporarily stop PCI transactions when said FIFO memory is filled to capacity;
   communication ports for transmitting the address and data bus signals received from said FIFO memory to the others of said general purpose computers, and for receiving the address and data bus signals from the others of said general purpose computers; and
   a bus comparator for comparing the address and data bus signals of said one of said general purpose computers with the address and data bus signals from the others of said general purpose computers, and for generating an interrupt signal when a mismatch is detected.

6. The system as set forth in claim 1, wherein each said PCI monitoring card comprises:
   a first in first out (FIFO) memory for storing the received PCI bus signals;
   compulsive stop logic for activating a stop signal to temporarily stop PCI transactions when said FIFO memory is filled to capacity;
   communication ports for transmitting the PCI bus signals received from said FIFO memory to the others of said general purpose computers, and for receiving the PCI bus signals from the others of said general purpose computers; and
   a bus comparator for comparing the PCI bus signals of said one of said general purpose computers with the address and data bus signals from the others of said general purpose computers, and for generating an interrupt signal when a mismatch is detected.

7. The system as set forth in claim 6, wherein said FIFO memory comprises a 32-bit clocked memory storing 32-bit signals received from the PCI bus.

8. The system as set forth in claim 6, wherein said FIFO memory provides a status signal to said compulsive stop logic when said FIFO memory is filled to capacity.

9. The system as set forth in claim 6, wherein said communication ports comprises fiber channel communication ports which receive and transmit data by means of fiber channels.

10. The system as set forth in claim 6, wherein said communication ports comprises fast ethernet ports which receive and transmit data by means of fast ethernet.

11. The system as set forth in claim 6, wherein said bus comparator transmits the interrupt signal to one of said general purpose computers and to the others of said general purpose computers via the PCI bus.

12. The system as set forth in claim 6, wherein said bus comparator comprises a dual 32-bit comparator which compares received 32-bit PCI bus signals.

13. A fault tolerant method utilizing a peripheral components interconnection (PCI) bus monitoring card, comprising the steps of:

receiving address and data PCI bus signals from one computer connected to a network and having a PCI bus;

receiving address and data PCI bus signals from at least one other computer through the network;

comparing said address and data PCI bus signals of said one computer with the address and data PCI bus signals from said at least one other computer;

generating an interrupt signal when said compared signals are different;

transmitting said interrupt signal to said one computer; and transmitting said interrupt signal to said at least one other computer.

14. A fault tolerant system for computers, each equipped with a peripheral components interconnection (PCI) bus, said system comprising:

PCI monitoring card means connected to each computer by means of a PCI bus for detecting faults by comparing PCI bus signals of each said computer with PCI bus signals of other computers; and network line means for connecting the PCI monitoring card means of said each computer with the PCI monitoring card means of said other computers.

15. The system as set forth in claim 14, wherein said PCI monitoring card means is connected to a central processing unit of said each computer by a PCI bridge.

16. The system as set forth in claim 14, wherein said PCI monitoring card means receives the PCI bus signals from said each computer and from said other computers via said PCI bus, and generates an interrupt signal when a mismatch results from comparing the PCI bus signals of said each computer with the PCI bus signals of said other computers.

17. The system as set forth in claim 16, wherein said PCI monitoring card means transmits said interrupt signal to said each computer and to said other computers.

18. The system as set forth in claim 14, wherein said PCI monitoring card means comprises:

a first in first out (FIFO) memory for receiving the PCI bus signals from the PCI bus, and for storing same;

compulsive stop logic for generating a stop signal to temporarily stop PCI transactions when said FIFO memory is full;

communication ports for transmitting the PCI bus signals received from said each computer to said other computers, and for receiving the PCI bus signals from said other computers; and a bus comparator for comparing the PCI bus signals of said each computer with the PCI bus signals from said other computers, and for generating an interrupt signal when the signals are different.

19. The system as set forth in claim 18, wherein said FIFO memory comprises a 32-bit clocked memory, and wherein the PCI bus signals comprise 32-bit address and data signals.

20. The system as set forth in claim 18, wherein said FIFO memory provides a status signal to said compulsive stop logic when said FIFO memory is full.

21. The system as set forth in claim 18, wherein said communication ports comprise fiber channel communication ports which receive and transmit data by means of fiber channels.

22. The apparatus as set forth in claim 18, wherein said communication ports comprise fast ethernet ports which receive and transmit data utilizing a fast ethernet.

23. The apparatus as set forth in claim 18, wherein said bus comparator provides the interrupt signal to said each computer and to said other computers through the PCI bus.

24. The apparatus as set forth in claim 18, wherein said bus comparator comprises a dual 32-bit comparator, and wherein the PCI bus signals comprise 32-bit address and data bus signals.

* * * * *